United States Patent [19]
Weng

[11] Patent Number: 5,986,901
[45] Date of Patent: Nov. 16, 1999

[54] POWER FACTOR CORRECTION CIRCUIT FOR A POWER SUPPLY

[75] Inventor: Da Feng Weng, Winchester, Mass.

[73] Assignee: Matsushita Electric Works R&D Laboratory, Inc., Woburn, Mass.

[21] Appl. No.: 09/112,381

[22] Filed: Jul. 9, 1998

[51] Int. Cl.⁶ ..................................................... H02M 1/12
[52] U.S. Cl. ................................................. 363/44; 363/37
[58] Field of Search ..................... 363/44, 34, 37, 363/84, 125; 323/207

[56] References Cited

U.S. PATENT DOCUMENTS

| | | | |
|---|---|---|---|
| 5,396,153 | 3/1995 | Shackle | 315/247 |
| 5,614,810 | 3/1997 | Nostwick et al. | 323/207 |
| 5,764,496 | 6/1998 | Sato et al. | 363/37 |

FOREIGN PATENT DOCUMENTS

| | | |
|---|---|---|
| 8-205520 | 8/1996 | Japan . |
| 8-251943 | 9/1996 | Japan . |

OTHER PUBLICATIONS

An article by Yong–Sik Youn et al., entitled "A Unity Power Factor Electronic Ballast for Florescent Lamp Having Improved Valley Fill and Valley Boost Converter", Conference Record PESC', May 1997.

*Primary Examiner*—Adolf Deneke Berhane
*Attorney, Agent, or Firm*—Greenblum & Bernstein, P.L.C.

[57] ABSTRACT

A power factor correction circuit, usable with, for example, a switching power supply of a discharge lamp. The power factor correction circuit includes a shaping system that shapes an input current of a power line during a predetermined period proximate a zero line crossing point of the input current; and a minimizing system that minimizes a pulsating of the input current.

23 Claims, 8 Drawing Sheets

POWER FACTOR CORRECTION CIRCUIT FOR A POWER SUPPLY

BACKGROUND OF THE INVENTION

1. Field of the Invention

The present invention is directed to single phase AC to DC converters with power factor correction (so that the power factor of the input current is at a power factor in excess of that of an otherwise comparable low-power-factor converter design), used, for example, in switching mode power supplies employed with discharge lamps (electronic ballast).

2. Description of the Prior Art

The demand for and development of power factor correction (PFC) circuits has been fueled by a concern over the massive use of electronic power converters, such as, for example, AC-DC-DC and AC-DC-AC power converters employed in electronics ballasts, and the resulting potential for electrical contamination of AC power lines. Because of cost considerations, it is usually desirable to employ a simple PFC circuit and increase the efficiency of the whole system.

PFC circuits are classified into two groups. A first group is defined as active PFC circuits. A second group is defined as passive PFC circuits. Boost-type active PFC circuits are popular due to the efficiency of such a PFC circuit. However, the efficiency of active PFC circuits is still lower than the efficiency of passive PFC circuits, due to, for example, active power switching circuits associated with the active PFC circuits. Further, the control of an active PFC circuit is complex (as compared to passive PFC circuits), resulting in increased manufacturing costs and reduced reliability of the circuit. Since passive PFC circuits do not employ active control circuitry, the manufacturing cost is low and the operating efficiency of the circuit is high (in comparison with active PFC circuits). However, passive PFC circuits exhibit higher levels of total harmonic distortion (THD) of the input current, as compared to active PFC circuits, and the power factor (PF) of passive PFC circuits is not as high as with active PFC circuits.

With respect to passive PFC circuits, valley-fill circuits provide better performance than other passive type PFC circuits, while being low in manufacturing cost. However, such circuits have their own unique problems. A conventional valley-fill circuit typically comprises two electrolytic capacitors C1 and C2, and three rectifying diodes D1, D2 and D3, as shown in FIG. 1.

Around the line peak, capacitors C1 and C2 are charged in series through diode D3 to half of the peak power line voltage. As long as the power line voltage remains above the voltage of each capacitor, the power line directly supplies power to the load. When the power line voltage falls below the voltage of each capacitor (e.g., the voltage falls to a valley voltage), bridge rectifier BR is back-biased, and diodes D1 and D2 become conductive, resulting in capacitors C1 and C2 feeding the load in parallel. Thus, the voltage supplied to the load follows the rectified power line voltage for about 120 degrees of the electrical waveform around the peak and follows the capacitors' voltage for about 60 degrees near the zero line crossing points.

Figures 1, 2A:
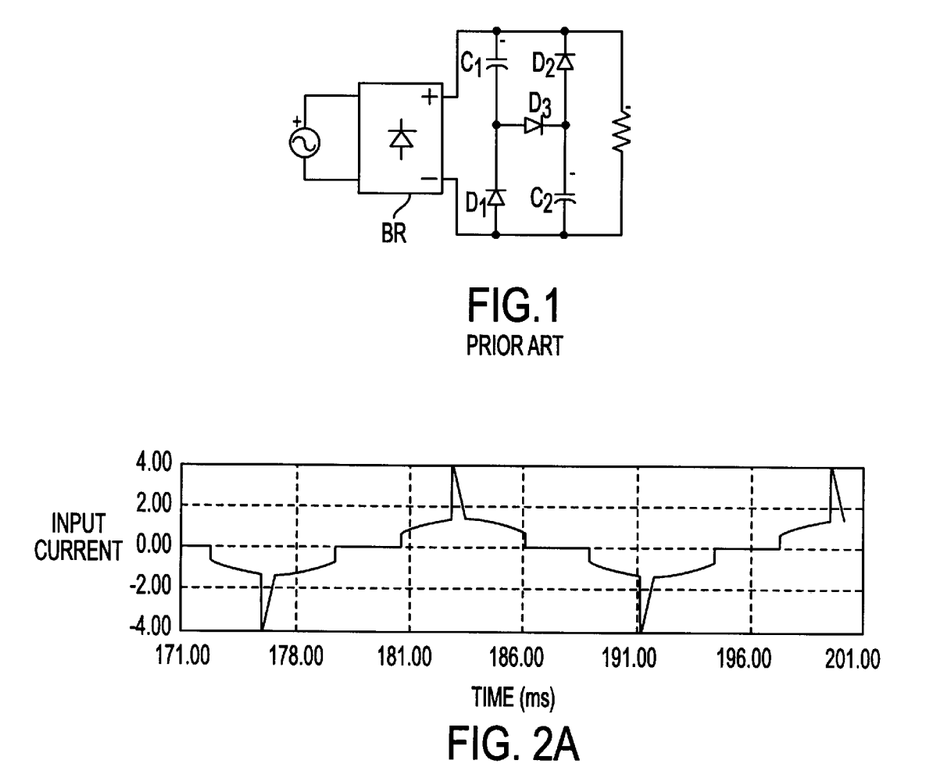
FIG. 1 illustrates a conventional basic valley-fill power factor correction circuit.
FIG. 2A illustrates an electrical waveform of an input current of the valley-fill power factor correction circuit of FIG. 1.
Figure 2B:
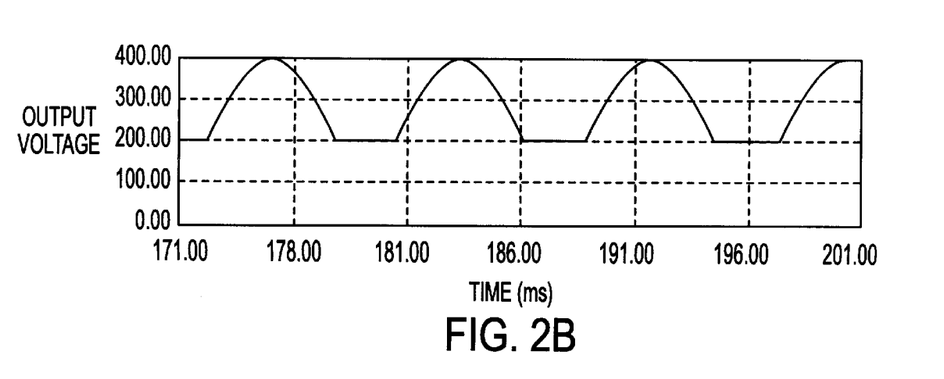
FIG. 2B illustrates an electrical waveform of an output voltage of the valley-fill power factor correction circuit of FIG. 1.

A pulsating line current charges the capacitors near the peak power line voltage, resulting in a deteriorated PF (of about 0.95) and a high THD (e.g., about 40%), as shown in FIG. 2A. The output of the valley fill circuit exhibits a large ripple from the half of the power line peak voltage to the power line peak voltage, with the ripple frequency being equal to twice the line frequency, as shown in FIG. 2B.

In the valley fill circuit, the power line directly feeds energy (e.g., electrical energy) to the load through the rectifier diodes for approximately 120 degrees around the peak voltage. As noted above, capacitors C1 and C2 feed energy to the load through diodes D1 and D2 for approximately 60 degrees near (proximate) the zero line crossing points. Most of the input energy is directly fed to the load, with a small portion of the input energy being first fed to capacitors C1 and C2, and then fed to the load through capacitors C1 and C2. As a result, such a circuit offers a relatively high operating efficiency.

A great deal of time and effort has been spent in attempts to improve the PFC performance of valley-fill circuits. This work has been directed to shaping the input current during the approximate 60 degree dead time near the zero line crossing points, and to limiting the pulsating line current that charges the capacitors near the peak line voltage.

Figure 3:
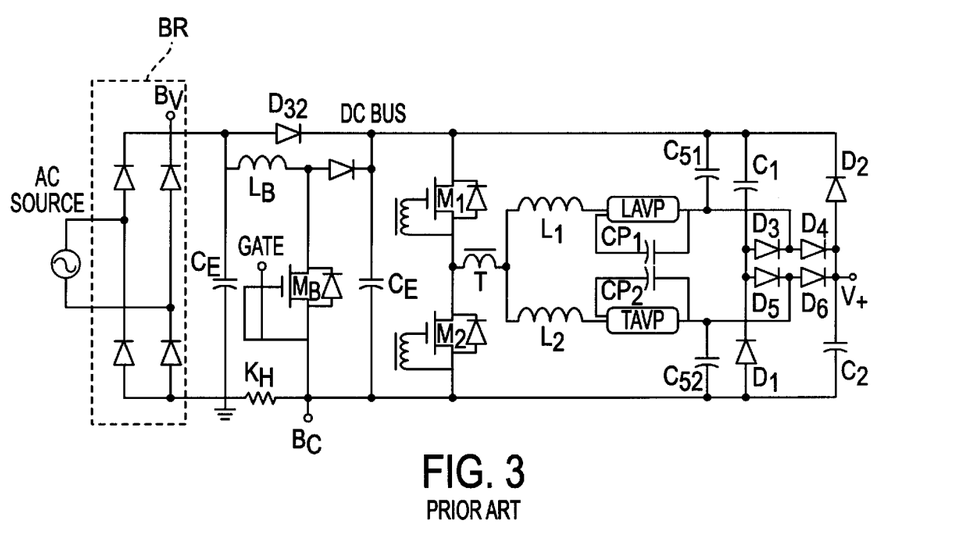
FIG. 3 illustrates a prior art valley-fill power factor correction circuit AC-DC-AC converter that employs an active boot circuit to shape an input current during a 60 degree dead time proximate a zero line crossing.
Figure 4:
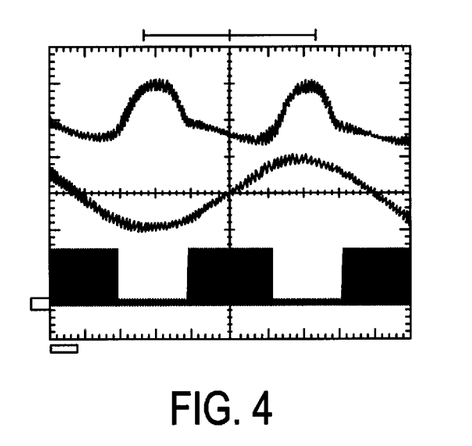
FIG. 4 illustrates electrical waveforms produced by the valley-fill power factor correction circuit of FIG. 3, in which the top waveform represents a DC bulk voltage, the middle waveform represents an input current, and the bottom waveform represents a switch driving signal.

A paper entitled "A Unity Power Factor Electronic Ballast for Fluorescent Lamp Having Improved Valley Fill and Valley Boost Converter" from Conference Record PESC'97, describes the use of an active boost circuit to shape the input current during the approximate 60 degree dead time near the zero line crossing points, as shown in FIG. 3. Because a boost switch still suffers the peak input voltage and the switch only works during the 60 degree dead time, as shown in FIG. 4, a complex control method is required. In addition, the complexity of the circuit increases the total manufacturing cost.

Figure 5:
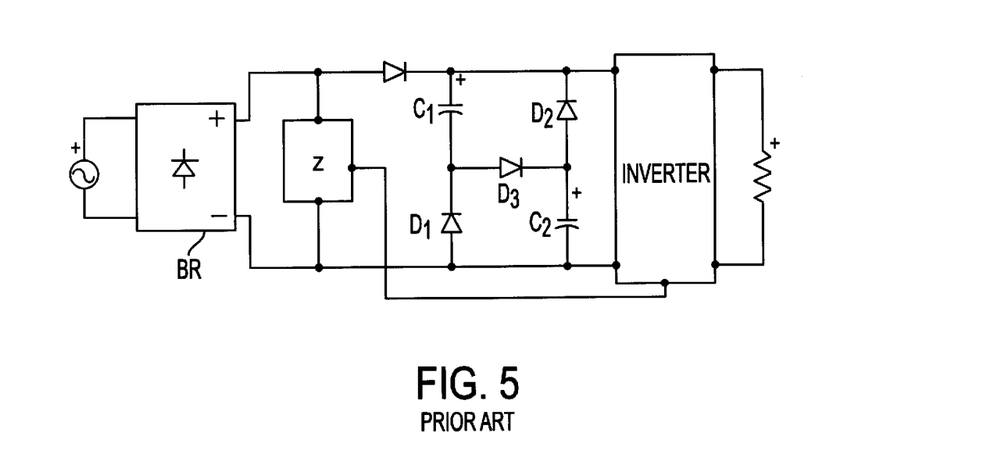
FIG. 5 illustrates another prior art valley-fill power factor correction circuit employing a charge pump circuit to shape an input current during an approximate 60 degree dead time.

U.S. Pat. No. 5,764,496 illustrated in FIG. 5, discloses the use of a high frequency output voltage or current of an inverter to drive a charge pump circuit Z. As shown in FIG. 5, the charge pump circuit shapes the input current during the approximate 60 degree dead time and charges two electrolytic capacitors C1 and C2. The two electrolytic capacitors C1 and C2 are not directly charged from the power line, so as to avoid the pulsating line current. However, because the charge pump is driven by the inverter and the charge pump works full time, the active switches are exposed to extra current and/or voltage stresses.

Figure 6:
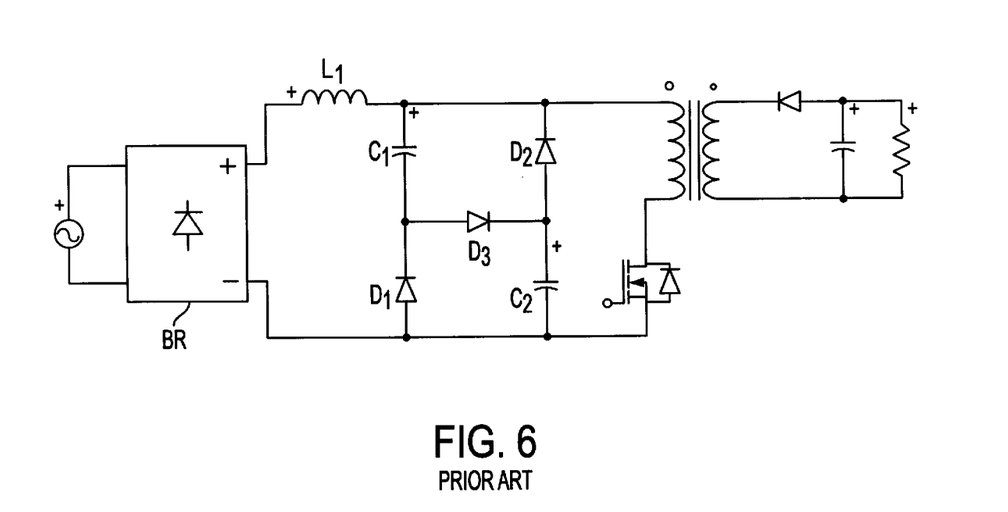
FIG. 6 illustrates a prior art valley-fill power factor correction circuit employing an input electromotive force generating device to avoid pulsating of the power line current.

Japanese Patent HEI 8-205520, illustrated in FIG. 6, describes the load current of a PFC converter as being discontinuous, and discloses that the insertion of a suitable inductor L1 in the input power line avoids (prevents) pulsating of the power line current. Because an instantaneous line voltage is higher than the voltage of each DC bulk capacitor C1 and C2, while being less than the sum of the voltages of the two capacitors, the inserted inductor provides a boost function to boost the sum of the voltage of the two capacitors. However, this disclosure fails to solve the above-described problem that exists at the input current during the approximate 60 degree dead time near the zero line crossing points.

SUMMARY OF THE INVENTION

Accordingly, the present invention is based on a valley fill circuit, but the 60 degree dead time and the pulsating current of the valley-fill PFC circuit is eliminated, while maintaining a high operating efficiency. According to the instant invention, a driving source of an auxiliary PFC circuit, such as, for example, a charge pump, is coupled from at least one leg of a valley-fill PFC circuit, so as to shape the input current during the approximate 60 degree dead time near the zero line crossing points. In addition, an electromotive force generating device (inductance device), such as, for example, an input inductor, is employed to reduce (or eliminate) the power line's pulsating line current and to help boost performance of an auxiliary PFC.

The present invention enables one to avoid the use of active switch and control circuitry for a PFC while keeping the advantages of a passive PFC circuit; namely, high efficiency, resulting in a lowered manufacturing cost. The PFC function automatically acts (functions) when the line voltage is less than the voltage on a pair of electrolytic capacitors.

According to another object of the present invention, a turn-on snubber is provided at a following power stage to increase the efficiency of a following power stage.

According to the present invention, a power factor correction circuit is disclosed and includes a system that shapes an input current of a power line during a predetermined period proximate a zero line crossing point of the input current, and a system that minimizes a pulsating of the input current. According to an advantage of the instant invention, an output of the power factor correction circuit is provided to a discontinuous power source, such as, for example, a discontinuous current load that is suitable for most power converter circuits as a following power stage, a discontinuous current input buck converter, a discontinuous current input full-bridge inverter, a discontinuous current input half-bridge inverter, a discontinuous current input buck-boost converter, a discontinuous current input flyback converter, or a discontinuous current input multi-switch forward converter.

According to an advantage of this invention, the charge pump device comprises a charge pump capacitance device, an electromotive force generating device, such as, an inductance device, and a multi-winding current transformer. One winding of the multi-winding current transformer is connected to the inductance device and the charge pump capacitance device. At least a second winding of the multi-winding current transformer is connected to at least one DC bulk capacitance device of the valley-fill PFC converter. In this way, an electrical charge stored in the charge pump capacitance can be charged by at least one winding of the current transformer during the approximate 60 degree dead time.

According to an object of the instant invention, a switching power supply is disclosed having an AC-to-DC converting device that converts an AC input line voltage to a DC voltage, an energy storage device (such as, for example, a valley-fill circuit) that stores electrical energy in which the stored energy is released to a load during a predetermined period of the AC input line voltage, and an auxiliary power factor corrector that operates, upon a release of the electrical energy (such as, for example, a high frequency discontinuous current), stored in the energy storage device, to shape the AC input line voltage during the predetermined period. The predetermined period comprises a period proximate a zero voltage crossing of the AC input voltage.

According to an advantage of the instant invention, a current limiting device is provided that limits a current input (or current output) of the AC-to-DC converting device.

According to another advantage of the present invention, the current limiting device comprises an electromotive force generator, such as, for example, an inductor.

A still further advantage of the present invention pertains to the auxiliary power factor corrector, which may, for example, comprise a charge pump power factor corrector. Such a charge pump power factor corrector includes a charge pump capacitance device (e.g., a capacitor) that stores energy from the AC input line voltage, with the stored energy being released to the energy storage device and/or the load, and a multi-winding current transformer that drives the charge pump capacitance device, in which the multi-winding current transformer is coupled from the stored energy released from the energy storage device.

The load comprises a switching converter that alternately receives energy from the energy storage device and from the AC input line voltage. A current mode controller is associated with the switching power supply to control an output voltage and/or current, in order to regulate the switching converter. The switching converter may be, for example, a DC-to-DC converter that supplies a DC output signal to an operating device (such as, for example, a discharge lamp), a DC-to-AC converter that provides a low frequency square wave output signal to the operating device, or a DC-to-AC converter that provides a high frequency sinusoidal wave output signal to the operating device.

According to another object of the present invention, a switching power supply comprises a rectifying device that receives an AC input line voltage and outputs a DC voltage, a switching converter that receives the AC input line voltage during a first predetermined period and provides electrical power to an operating device (such as, for example, a discharge lamp), a valley-fill circuit that includes an energy storage device to store electrical energy, the stored energy being released to the switching converter during a second predetermined period related to a zero voltage crossing of the AC input line voltage, and an auxiliary power factor corrector that operates, upon a release of the electrical energy that was stored in the energy storage device, to shape the AC input line current during the predetermined period.

According to another object of the present invention, a method for supplying power with a power factor correction is disclosed. The method comprises converting an AC input line voltage to a DC voltage, after which, a valley-fill circuit is used to store electrical energy, with the stored energy being released to a load during a predetermined period of the AC input line voltage. In addition, an auxiliary power factor corrector is employed to shape the AC input line current upon the release of the stored energy.

BRIEF DESCRIPTION OF THE DRAWINGS

The foregoing and other objects, features and advantages of the invention will be apparent from the following more particular description of preferred embodiments, as illustrated in the accompanying drawings which are presented as non-limiting examples, in which reference characters refer to the same parts throughout the various views, and wherein.

DETAILED DESCRIPTION OF THE INVENTION

Figure 7:
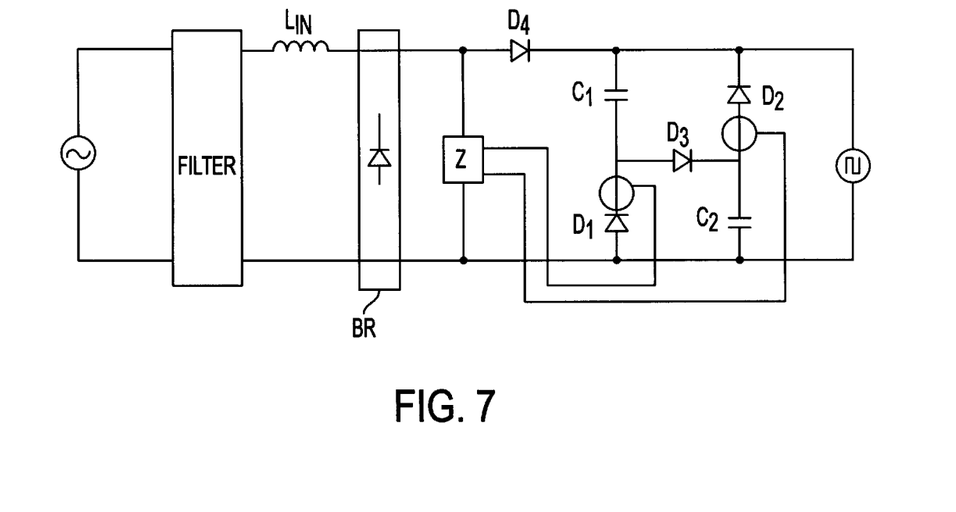
FIG. 7 illustrates a block diagram of a charge pump valley-fill power factor correction AD-DC converter according to a preferred embodiment of the instant invention.

The present invention discloses a passive PFC circuit that exhibits a high operating efficiency. A block diagram of a preferred embodiment is illustrated in FIG. 7. As shown in the drawing, a driving source of an auxiliary PFC circuit Z, such as, for example, a charge pump, is coupled (such as, for example, by inductive coupling) from at least one leg of the valley-fill circuit to shape the input current during the 60 degree dead time near the zero line crossing points. An inserted input inductor device (energy storage device) Lin, such as, for example, an inductor, is provided to avoid (prevent the occurrence of) the power line's pulsating line current and to help the auxiliary PFC work. Thus, the present invention, in its most basic form, over-comes the above-noted problems of the prior art; namely, the existence of the approximate 60 degree dead time and the pulsating current of the valley-fill PFC circuit.

As shown in FIG. 7, the load of the PFC converter comprises a discontinuous current source that exhibits a minimum dead time. During the dead time, the load current is zero. The auxiliary PFC's driving source is coupled from at least one leg of the valley-fill circuit. The leg (or legs) is (are) composed of a pair of diodes and a pair of DC bulk capacitors. In the preferred embodiment, the driving source coupled from the legs is a high frequency unipolar current source.

Figure 8:
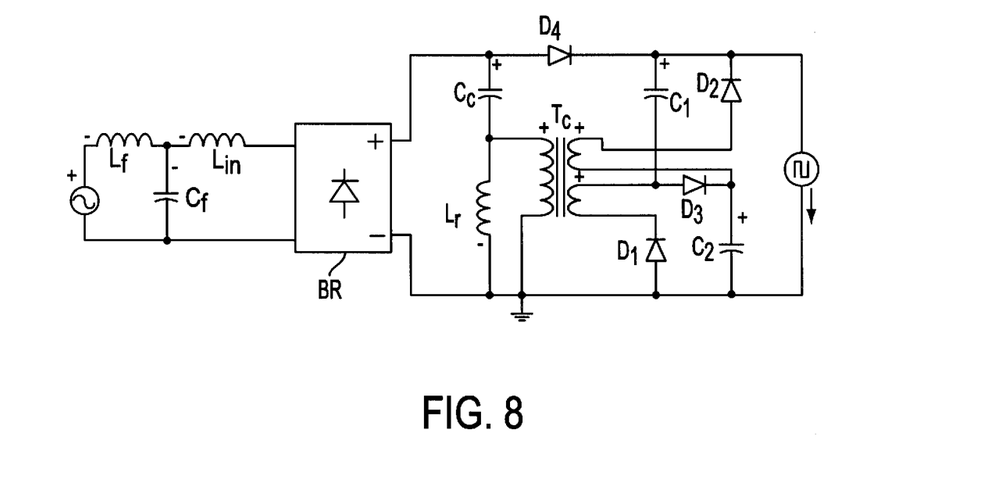
FIG. 8 illustrates an electrical circuit diagram of a single phase high power factor correction converter with a discontinuous current load according to the preferred embodiment of the present invention.

FIG. 8 illustrates a circuit of the preferred embodiment of the present invention. As shown in FIG. 8, the preferred embodiment of the present invention comprises a bridge rectifier BR, a differential filter made up of inductor Lf and capacitor Cf, an inserted inductor Lin, a charge pump capacitor Cc, an electromotive force generating device (such as, for example, a charge pump inductor Lr), a block diode D4, a triple winding current transformer Tc, three valley-fill diodes D1, D2 and D3, two DC bulk capacitors C1 and C2, and a discontinuous power source, such as, for example, a buck, a buck-boost, a boost, a forward, a flyback, a resonant inverter circuit, or any other equivalent discontinuous power load.

The auxiliary PFC circuit comprises the charge pump capacitor Cc, the charge pump inductor Lr, and the current transformer Tc. The current transformer Tc couples the driving source from the legs of the valley-fill circuit to shape the input current and produce an opposite direction high frequency unipolar current source from the charge pump inductor Lr to release the energy stored in the charge pump capacitor Cc. Inductor Lin is added to limit (minimize) the pulsating current and to serve as a boost function to help the auxiliary PFC circuit to work.

It is noted that the discontinuous power (current) load is generated by the switching converter, such as, for example, a buck converter, a buck-boost converter, a flyback converter, a forward converter, a resonant converter, or any other type of switching converter.

It is further noted that because the output voltage of the valley-fill PFC circuit exhibits a significant amount of ripple, current mode control, charge mode control, or one-cycle control is employed in the following converter in order to make the output voltage ripple free.

The operation of the preferred embodiment will be described with respect to two working (operating) modes; a direct feed mode (corresponding to a situation in which an instantaneous input line voltage is higher than the voltage of each DC bulk capacitor C1 and C2), and a charge pump mode (corresponding to a situation in which the instantaneous input line voltage is lower than the voltage of each DC bulk capacitor C1 and C2).

The following discussion will be based on an input AC voltage during a positive period. The operation during a negative period is basically the same.

Direct Feed Mode

In the direct feed mode, the input voltage is higher than the voltage of each DC bulk capacitor C1 and C2, but less than the sum of the voltage of each DC bulk capacitor C1 and C2. As the PFC's load current changes from zero to a fixed value, the input line will directly feed electrical energy (power) to the load through inductor Lin and the bridge rectifier BR. Because the load current passes through inductor Lin, energy is stored in inductor Lin. As the load current decreases from the fixed value down to zero, the energy stored in inductor Lin is released to the two DC bulk capacitors C1 and C2, in series, through diode D3. Because the input power line is in series with the inductor Lin, the input power line charges the two DC bulk capacitors C1 and C2 through inductor Lin. Because the input power line is less than the sum (total) of the voltages of the two DC bulk capacitors C1 and C2, the charging current in Lin decays (dissipates).

In the direct feed mode, each switching period is divided into two intervals. During the first interval, the input power line directly feeds energy (power) to the load. During the second interval, the input power line charges the two DC bulk capacitors C1 and C2 through inductor Lin.

Charge Pump Mode

In the charge pump mode, the input AC voltage is lower than the voltage of each DC bulk capacitor C1 and C2. Because the input voltage is lower than the voltage of the DC bulk capacitors C1 and C2, the two DC bulk capacitors C1 and C2 release their stored energy to the load, in parallel, as the load current changes from zero to a fixed value. Current passes through two winding of the current transformer Tc. It should be noted that the third winding of the current transformer Tc must also have a current passing through it, in order to avoid saturation of the current transformer Tc.

The current's amplitude is equal to a turn-ratio (of the windings) times the sum of two other winding's currents. The direction of the current passing in the third winding is opposed (opposite) to the direction of the currents passing through the other two windings. It is the third winding's current that is used to absorb the input energy from the power line when the instantaneous input voltage is lower than the voltage in one of the DC bulk capacitors C1 or C2.

Initially, the third winding absorbs the current from the charge pump capacitor Cc, so that the current charges the charge pump capacitor Cc, and the voltage on the charge pump capacitor Cc increases. The two DC bulk capacitors C1 and C2 are prevented from charging the charge pump capacitor Cc by the block diode D4. A charging loop of the charge pump capacitor Cc is set up between the input power line, the differential filter (comprising inductor Lf and capacitor Cf), the inductor Lin and the bridge rectifier BR.

When the amplitude of the charging current becomes higher than the current in the inductor Lin, both the input and the output of the bridge rectifier BR are shorted, and the inductor Lin is excited by the input power line. Because of the voltage on the charge pump capacitor Cc, the current in the charge pump inductor Lr increases (rises) from zero up to the amplitude of the third winding current. Thereafter, the current in the third winding of the current transformer Tc's circulates through the inductor Lr, and no current passes through the charge pump capacitor Cc.

As the load current changes (decreases) from the fixed value down to zero, the charge pump capacitor Cc and the inductor Lr release their stored energy to the two DC bulk capacitors C1 and C2 through diode D3. At the same time, inductor Lin and the input power line also releases (or feeds) energy to the two DC bulk capacitors C1 and C2. Each switching period in the charge pump mode can be divided into two intervals. During the first interval, the input power line will directly feed (supply) energy to inductor Lin, inductor Lr and charge pump capacitor Cc. During the second interval, the input power line will charge the two DC bulk capacitors C1 and C2 through inductor Lin. Inductor Lr and charge pump capacitor Cc will release their stored energy to the two DC bulk capacitors C1 and C2.

Because the input power line always feeds (supplies) energy to the converter, the above-discussed problem of the input current during the 60 degree dead time near the zero line crossing points is solved. Further, because the currents in the branches of diodes D1 and D2 are discontinuous, it is possible to use a high frequency current transformer to couple and output a unipolar high frequency current source, such that an instant current varies from a fixed value to zero. Currents associated with diodes D1 and D2 exist only during the 60 degree dead time, and the charge pump mode automatically operates during this period to shape the input current. As a result, the circuit's circulating current is low.

An extra benefit of the present invention is that the output has a turn-on snubber function. Because the circuit's power path includes inductors Lr and Lin, or the current transformer Tc with leakage inductors, the output current of the PFC circuit can not jump from zero to a fixed load current. Instead, it will take time to set up the output current to follow the load current it offers the turn-on snubber function.

Figure 9:
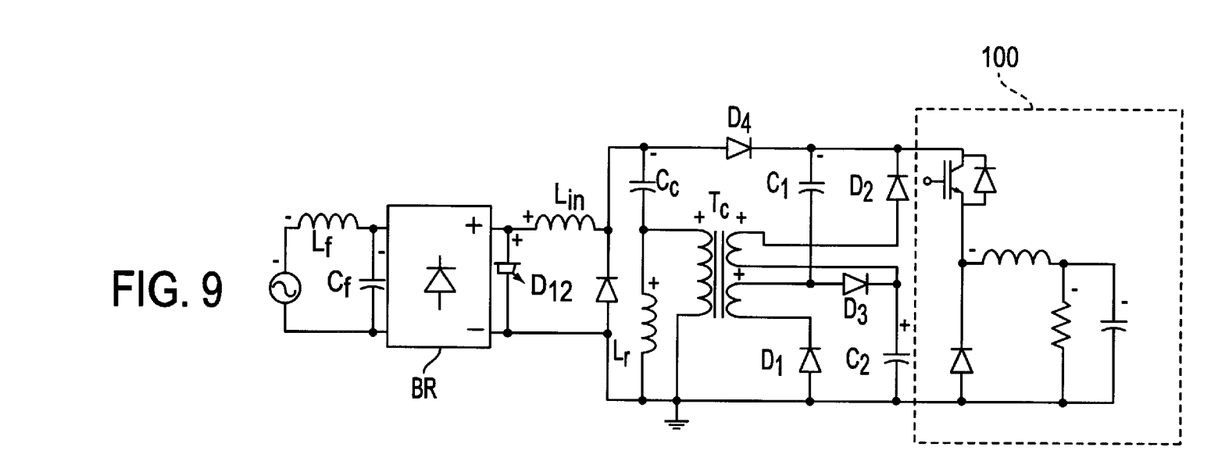
FIG. 9 illustrates an electrical circuit diagram of a second embodiment of the present invention, showing a single phase high power factor correction converter with a discontinuous current input buck converter.

A second embodiment of the present invention is illustrated in FIG. 9. In this embodiment, a buck circuit 100 is provided as a following power stage, in which the buck circuit works in a continuous current mode. In this embodiment, the PFC circuit can not provide the required load current immediately when the buck switch turns ON. The output voltage of the PFC circuit drops to zero, and the voltages on the buck switch and associated freewheel diode are zero. After a short interval, the output current of the PFC circuit increases to the load current, and the output voltage goes back (returns) to the input voltage. As a result, the switching turn-on loss of this embodiment is zero.

Figure 10:
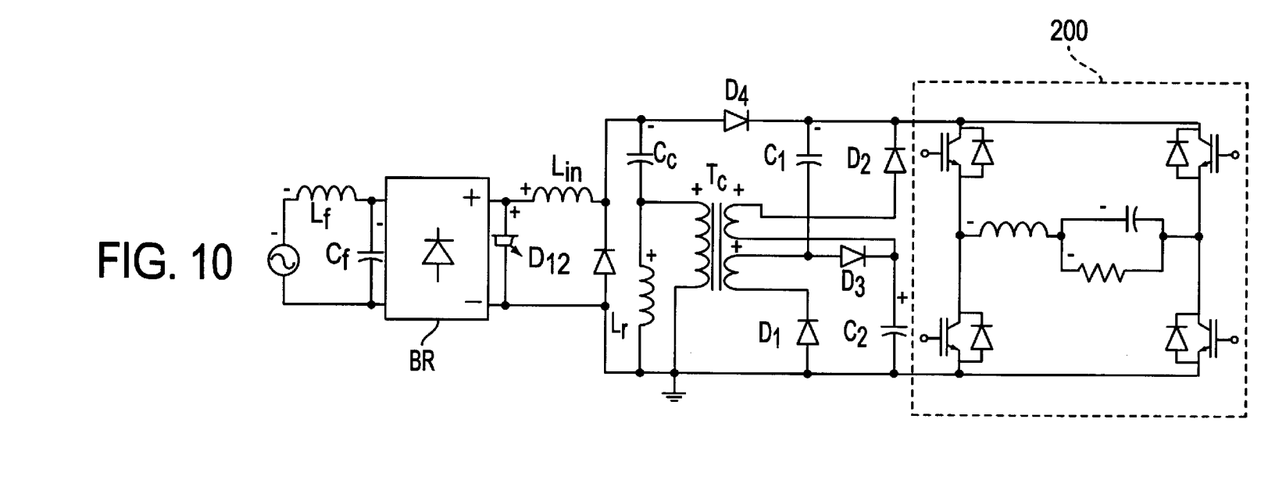
FIG. 10 illustrates an electrical circuit diagram of a third embodiment of the present invention, showing a single phase high power factor correction converter with a discontinuous current input full-bridge inverter.
Figure 16A:
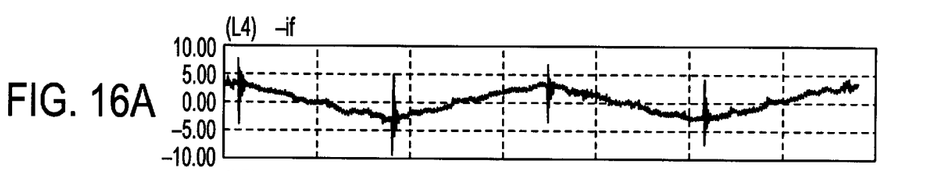
FIG. 16A illustrates an electrical waveform of an input line current associated with a discharge lamp ballast employed in the embodiment of FIG. 10.
Figure 16B:
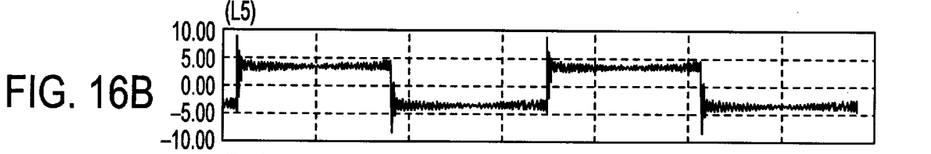
FIG. 16B illustrates an electrical waveform of a buck inductor current associated with the discharge lamp ballast of FIG. 10.
Figure 16C:
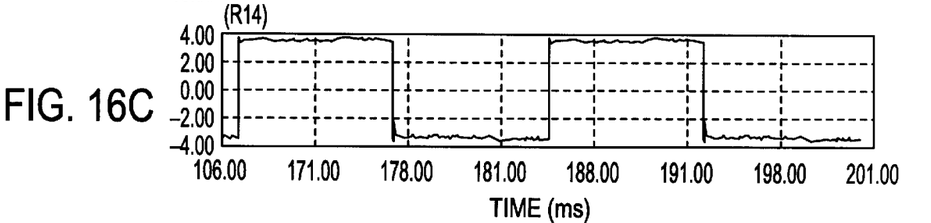
FIG. 16C illustrates an electrical waveform of the lamp current of the embodiment of FIG. 10.

FIG. 10 illustrates a third embodiment of the present invention. In this embodiment, a discharge lamp, such as, for example, a high intensity discharge (HID) lamp, is driven by the PFC converter. A full bridge inverter 200 outputs a low frequency square AC current source, as shown in FIG. 16. In this embodiment, the input DC bulk voltage of the inverter exhibits a large ripple. Thus, a current mode control is employed to maintain (keep) the output current ripple free. Because of the lamp specifications and the larger input DC bulk voltage ripple, in order to avoid having the lamp extinguish itself as the lamp current changes its polarity, it is necessary to synchronize the output AC with the input AC. In this way, it can be guaranteed that as the DC bulk voltage approaches its peak (which is high enough to maintain a re-ignition voltage to reignite the lamp), the lamp current changes its polarity, as shown in FIG. 16.

It is noted that the output of the ballast is synchronized with the input AC line. When the instantaneous input voltage is proximate its peak, the output current changes polarity, from, for example, positive to negative (or from negative to positive). This ensures that there is a high enough (e.g., sufficient) re-ignition voltage to re-ignite the discharge lamp.

Figure 11:
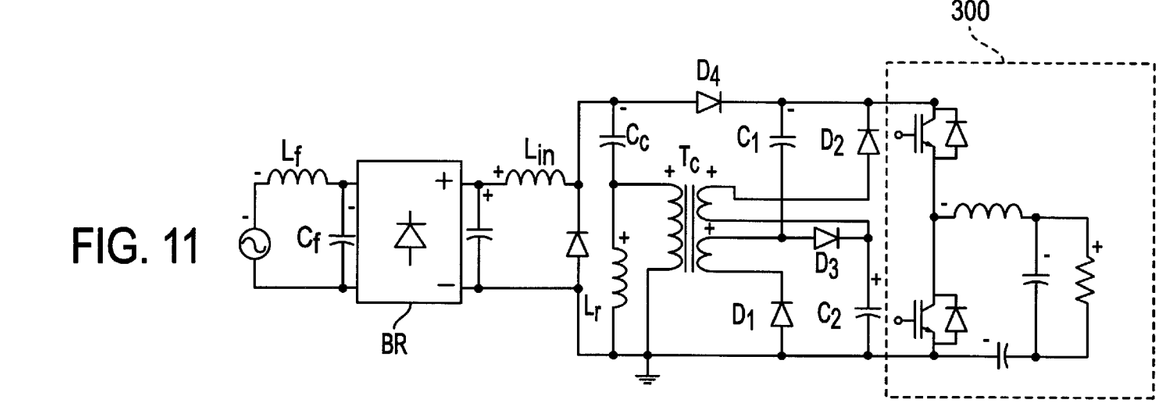
FIG. 11 illustrates an electrical circuit diagram of a fourth embodiment of the present invention, showing a single phase high power factor correction converter with a discontinuous current input half-bridge inverter.
Figure 12:
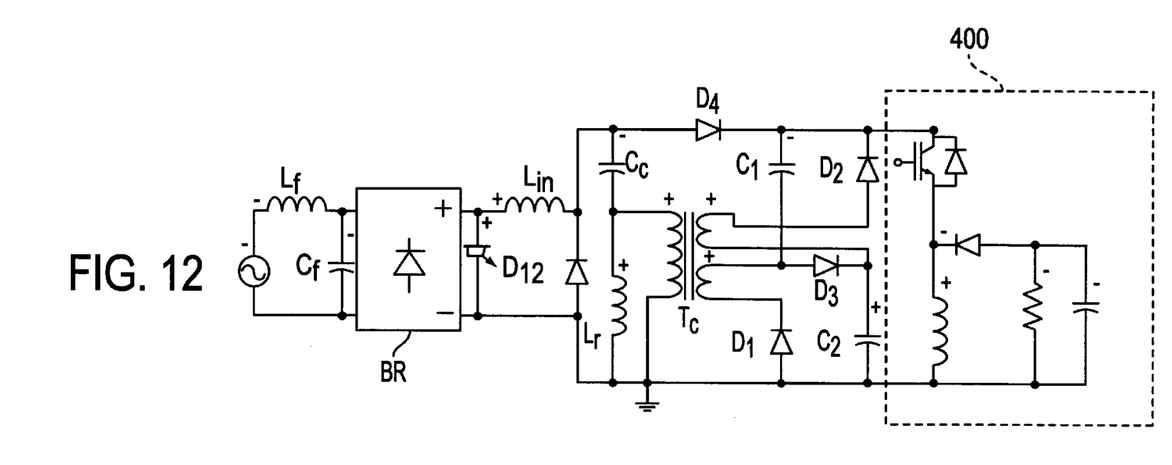
FIG. 12 illustrates an electrical circuit diagram of a fifth embodiment of the present invention, showing a single phase high power factor correction converter with a discontinuous current input buck-boost converter.
Figure 13:
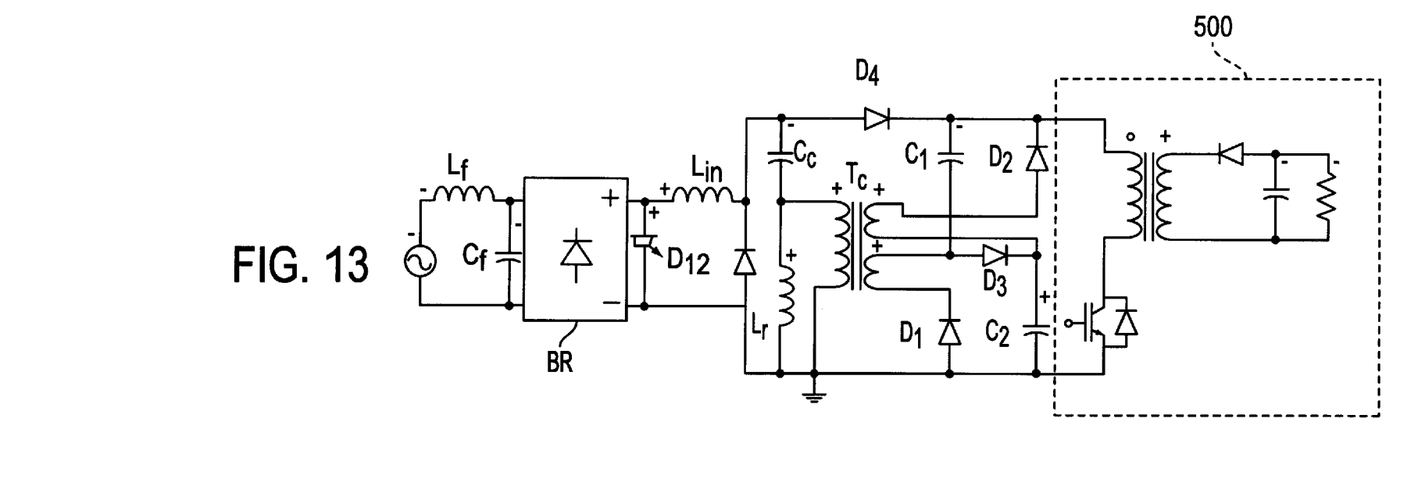
FIG. 13 illustrates an electrical circuit diagram of a sixth embodiment of the present invention, showing a single phase high power factor correction converter with a discontinuous input flyback converter.

FIG. 11 illustrates a fourth embodiment of the present invention. In this embodiment, a half bridge 300 is employed (used) to drive the discharge lamp, such as, for example, a fluorescent lamp, with a high frequency sinusoidal AC current.

FIGS. 12 to 15 illustrate fifth, sixth, seventh and eighth embodiments of the present invention. In the fifth embodiment (FIG. 12), the PFC converter is interfaced to a discontinuous current input buck-boost converter 400. The sixth embodiment (FIG. 13) illustrates the PFC converter of the present invention being interfaced to a discontinuous current input flyback converter 500. The seventh embodiment (FIG.

Figure 14:
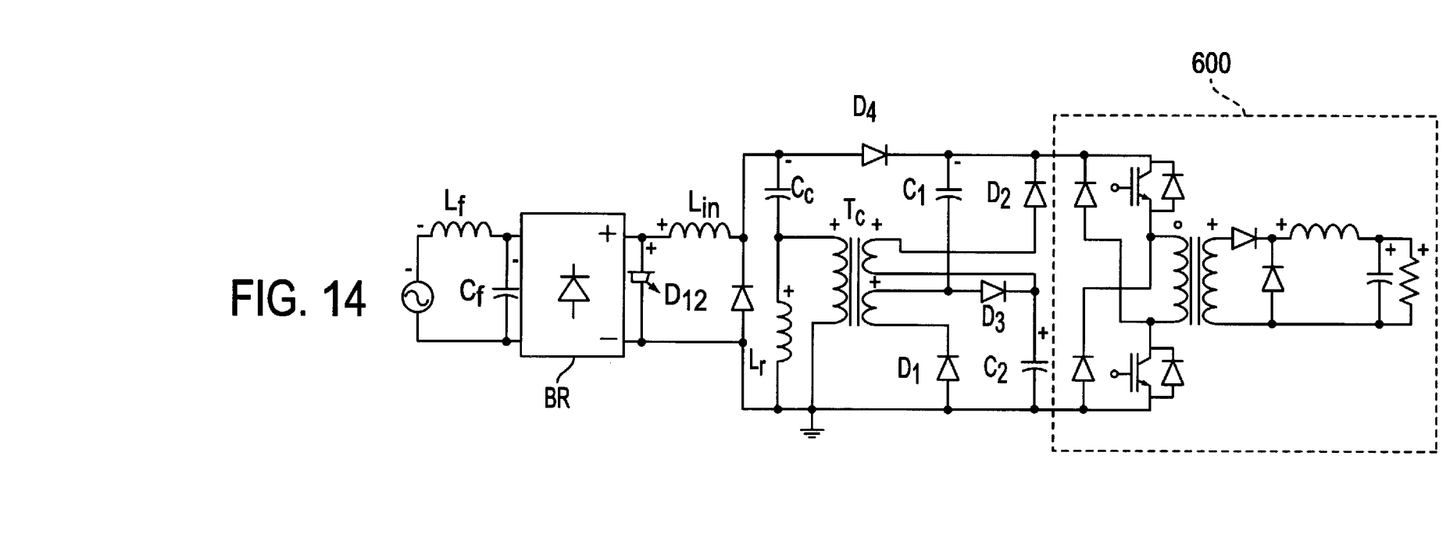
FIG. 14 illustrates an electrical circuit diagram of a seventh embodiment of the present invention, showing a single phase high power factor correction converter with a discontinuous current input two-switch input forward converter.
Figure 15:
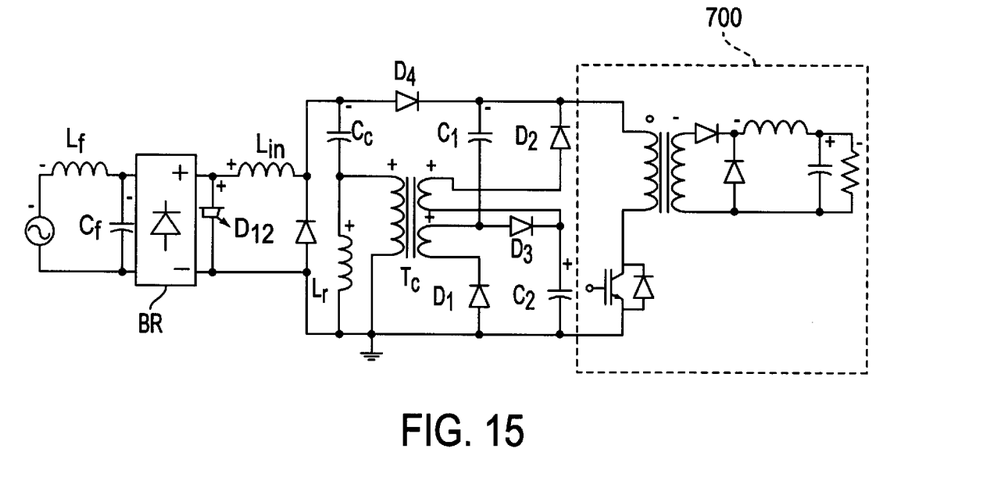
FIG. 15 illustrates an electrical circuit diagram of an eighth embodiment of the present invention, showing a single phase high power factor correction converter with a discontinuous current input forward converter.

14) illustrates the PFC converter of the present invention being interfaced to a two-switch forward converter 600. The eighth embodiment (FIG. 15) illustrates the PFC converter of the instant invention interfaced to a discontinuous current input forward converter 700.

The present invention provides several significant improvements over prior art devices. The PFC converter of the present invention provides an improved PFC function, as compared to the prior art. The present invention does not impose any additional current or voltage stresses on the buck switches. In addition, the improved valley-fill power stage of the instant invention is passive. As a result, the efficiency and reliability of the PFC stage of the present invention is very high and the manufacturing cost is low. Additionally, because of providing an automatic turn-on snubber function for the following stage, the following power circuit of the present invention can operate with a high frequency switching supply, enabling the reduction in size of the power supply system.

I claim:

1. A switching power supply, comprising:
    an AC-to-DC converting device that converts an AC input line voltage to a DC voltage;
    an energy storage device that stores a DC voltage that is lower than a peak value of said AC input line voltage, said DC voltage stored in said energy storage device being released to a load during a period when a rectified AC input line voltage is lower than said DC voltage; and
    an auxiliary power factor corrector that operates, upon a release of said DC voltage stored in said energy storage device, to shape an AC input line current during said period.

2. The switching power supply of claim 1, wherein said energy storage device releases a high frequency discontinuous current.

3. The switching power supply of claim 1, further comprising a current limiting device that limits a current of said AC-to-DC converting device.

4. The switching power supply of claim 3, wherein said current limiting device limits a current input to said AC-to-DC converting device.

5. The switching power supply of claim 3, wherein said current limiting device limits a current output of said AC-to-DC converting device.

6. The switching power supply of claim 3, wherein said current limiting device comprises an electromotive force generator.

7. The switching power supply of claim 6, wherein said electromotive force generator comprises an inductor.

8. The switching power supply of claim 1, wherein said auxiliary power factor corrector comprises a charge pump power factor corrector.

9. The switching power supply of claim 8, wherein said charge pump power factor corrector comprises:
    a charge pump capacitance device that stores energy from said AC input line voltage, said stored energy being released to at least one of said energy storage device and the load; and
    a multi-winding current transformer that drives said charge pump capacitance device, said multi-winding current transformer being coupled to said released energy from said energy storage device.

10. The switching power supply of claim 1, wherein said energy storage device comprises a valley-fill circuit.

11. The switching power supply of claim 1, wherein the load comprises a switching converter that alternately receives energy from said energy storage device and from the AC input line voltage.

12. The switching power supply of claim 11, wherein said switching converter further comprises a current mode controller that senses at least one of an output voltage and a current, in order to regulate said switching converter.

13. The switching power supply of claim 11, wherein said switching converter comprises a DC-to-DC converter that supplies a DC output signal to an operating device.

14. The switching power supply of claim 11, wherein said switching converter comprises a DC-to-AC converter that provides a low frequency square wave output signal to an operating device.

15. The switching power supply of claim 11, wherein said switching converter comprises a DC-to-AC converter that provides a high frequency sinusoidal wave output signal to an operating device.

16. The switching power supply of claim 14, wherein the operating device comprises a discharge lamp.

17. The switching power supply of claim 14, wherein the operating device comprises a discharge lamp.

18. The switching power supply of claim 15, wherein the operating device comprises a discharge lamp.

19. A switching power supply, comprising:
    a rectifying device that receives an AC input line voltage and outputs a DC voltage;
    a switching converter that receives the AC input line voltage during a predetermined period and provides electrical power to an operating device;
    a valley-fill circuit that includes an energy storage device to store a DC voltage that is lower than a peak value of said AC input line voltage, said DC voltage stored in said energy storage device being released to said switching converter during a period of time when a rectified AC input line voltage is lower than said DC voltage; and
    an auxiliary power factor corrector that operates, upon a release of said DC voltage stored in said energy storage device, to shape an AC input line current during said period of time.

20. The switching power supply of claim 19, wherein said operating device comprises a discharge lamp.

21. The switching power supply of claim 19, wherein said auxiliary power factor corrector comprises a charge pump power factor correction circuit.

22. The switching power supply of claim 21, wherein said charge pump power factor circuit comprises:
    a charge pump capacitance device that stores energy from the AC input line voltage, said stored energy being released to at least one of said energy storage device and the load; and
    a multi-winding current transformer that drives said charge pump capacitance device, said multi-winding current transformer being coupled to said stored energy released from said energy storage device.

23. A method for supplying power with a power factor correction, comprising:
    converting an AC input line voltage to a DC voltage;
    using a valley-fill circuit to store a DC voltage that is lower than a peak voltage of said AC input line voltage, the stored DC voltage being released to a load during a period of time when a rectified AC input line voltage is lower than the DC voltage; and
    employing an auxiliary power factor corrector to shape an AC input line current upon the release of the stored DC voltage.

* * * * *

UNITED STATES PATENT AND TRADEMARK OFFICE
CERTIFICATE OF CORRECTION

PATENT NO. :      5,986,901
DATED      :      November 16, 1999
INVENTOR(S) :    D. WENG It is certified that error appears in the above-identified patent and that said Letters Patent is hereby corrected as shown below:

At column 10, line 16 (claim 16, line 1) of the printed patent, "14" should be —13—.

Signed and Sealed this

Twenty-seventh Day of February, 2001

Attest:

NICHOLAS P. GODICI

Attesting Officer    Acting Director of the United States Patent and Trademark Office